US 6,946,985 B2
(12) United States Patent
Nicolaidis (10) Patent No.: US 6,946,985 B2
(45) Date of Patent: Sep. 20, 2005

(54) DEVICE FOR RECONFIGURING A FAULTY STORAGE ASSEMBLY

(75) Inventor: Michael Nicolaidis, Saint Egreve (FR)

(73) Assignee: IROC Technologies, Grenoble (FR)

( * ) Notice: Subject to any disclaimer, the term of this patent is extended or adjusted under 35 U.S.C. 154(b) by 89 days.

(21) Appl. No.: 10/468,265

(22) PCT Filed: Feb. 12, 2002

(86) PCT No.: PCT/FR02/00523
§ 371 (c)(1),
(2), (4) Date: Dec. 6, 2003

(87) PCT Pub. No.: WO02/65291

PCT Pub. Date: Aug. 22, 2001

(65) Prior Publication Data

US 2004/0075461 A1 Apr. 22, 2004

(30) Foreign Application Priority Data

Feb. 12, 2001 (FR) .............................. 01 01884

(51) Int. Cl.[7] .............................................. H03M 1/00
(52) U.S. Cl. ..................... 341/141; 341/161; 326/40; 326/46
(58) Field of Search .............................. 341/141, 159, 341/161, 162; 326/37, 38, 46, 40

(56) References Cited

U.S. PATENT DOCUMENTS 4,205,301 A * 5/1980 Hisazawa .................. 714/703
4,355,391 A * 10/1982 Alsop, IV .................. 714/759

OTHER PUBLICATIONS

French Search Report for application FR 0101884, FA 598191, Dec. 28, 2001, citing US 6,151,263, Nov. 21, 2000.

International Search Report for PCT application PCT/FR 02/00523 citing US 6,151,263, Nov. 2000.

* cited by examiner

Primary Examiner—Michael Tokar
Assistant Examiner—John B Nguyen
(74) Attorney, Agent, or Firm—Erwin J. Basinski (57) ABSTRACT

The invention CONCERNS a device for reconfiguring an assembly of N basic electronic modules associated with k redundant modules comprising: N multiplexers each having a first terminal ($d_i$) capable of being connected to k+1 second terminals connected to the k+1 input/output terminals of a sequenced group of modules consisting of a basic module ($U_i$) and k other modules; N+k triggers ($F_i$) indicating a good or faulty condition of one of the N+k modules; and logic means associated with each multiplexer of rank j, where j is an integer ranging between 0 and N, to determine the number of triggers of rank 0 to j indicating a faulty condition, to determine the number of modules of the sequenced group associated with the module of rank j, to be counted to find a number of good modules equal to the first number, and to convert the first terminal of the multiplexer to its second terminal of rank equal to the second number.

6 Claims, 5 Drawing Sheets

DEVICE FOR RECONFIGURING A FAULTY STORAGE ASSEMBLY

CROSS-REFERENCE TO RELATED APPLICATIONS

This application claims priority from the parent French application, serial 01/01884 filed on 12 Feb. 2001, and the related PCT application PCT/FR02/00523 filed on 12 Feb. 2002 which designated the United States.

BACKGROUND OF THE INVENTION

The present invention relates to a device for reconfiguring an assembly of N electronic devices associated with k replacement units or redundant units. The case where the electronic units are memory units that may be blocks of a large-size memory and/or lines or columns of a memory will be here considered. It should however be reminded that the present invention generally relates to the reconfiguring of an assembly of electronic units.

Figure 1A:
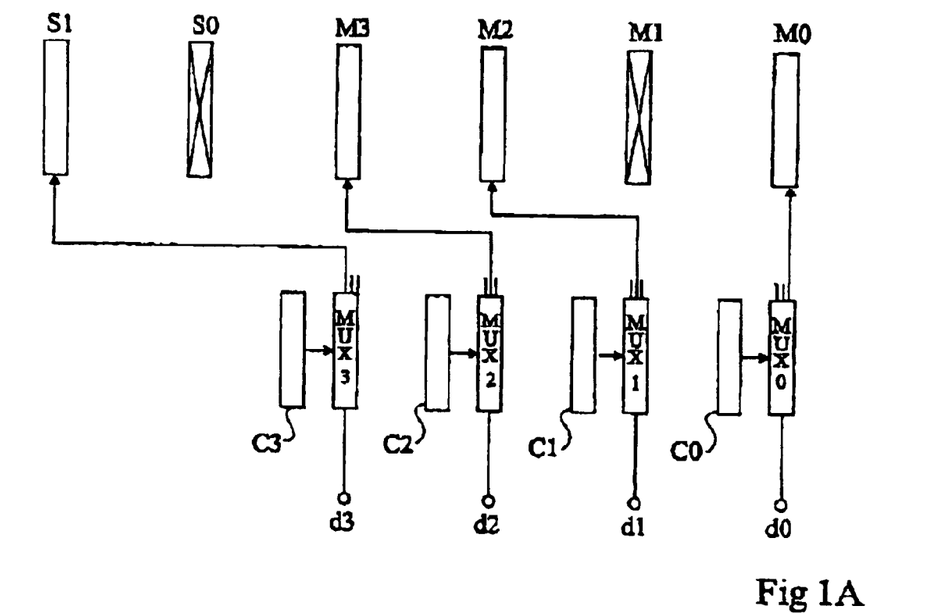
FIGS. 1A and 1B show examples of reconfiguration of memory blocks intended to illustrate the problem to be solved by the present invention.
Figure 1B:
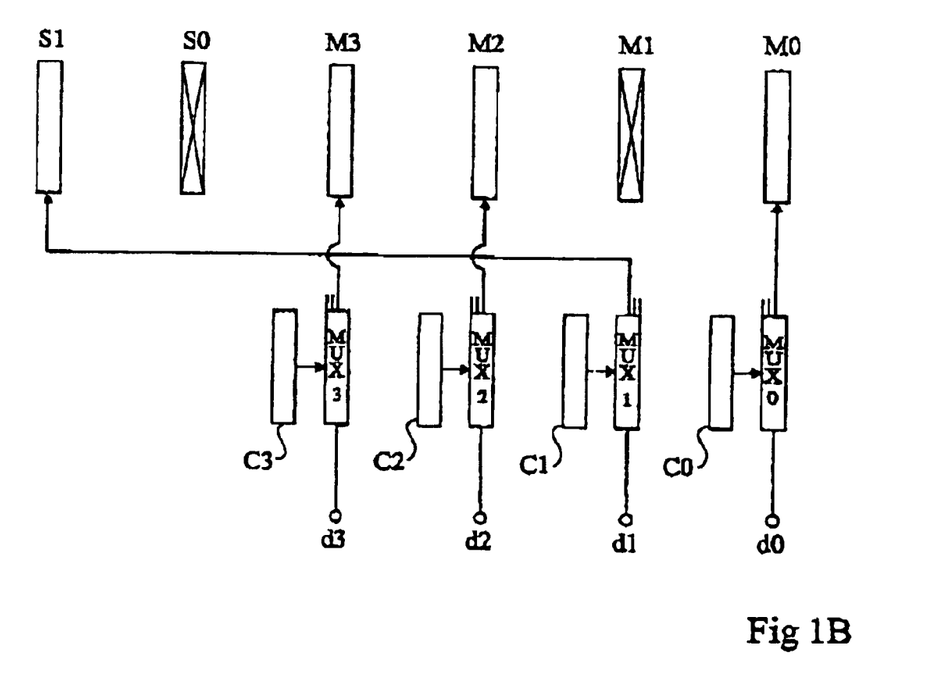

FIGS. 1A and 1B illustrate in a very simplified fashion the problem that the present invention aims at solving. Four memory cell blocks $M_0$ to $M_3$ are considered. In practice, these will for example be columns of a memory that can comprise more than one thousand columns. Some of the memory blocks may exhibit a defect. Then, it is provided to replace the defective block with a replacement block. Two replacement blocks $S_0$ and $S_1$ have been shown. In fact, several tens of replacement blocks may be provided.

To perform this replacement, instead of connecting the data input/output terminals $d_0$, $d_1$, $d_2$, $d_3$ directly to memory blocks $M_0$, $M_1$, $M_2$, $M_3$, it is provided to connect these terminals to the memory blocks via multiplexers $MUX_0$, $MUX_1$, $MUX_2$, $MUX_3$, respectively controlled by control blocks $C_0$, $C_1$, $C_2$, $C_3$. In the case where there are k replacement blocks, each multiplexer will comprise k+1 outputs. In the example of FIGS. 1A and 1B, it is assumed that the second one, $M_1$, of the base memory blocks and the first one, $S_0$, of the replacement memory blocks are defective.

In the embodiment of FIG. 1A, it is provided to replace each defective memory block with its closest non-defective neighbor. A substitution "from close to close" is performed. Each multiplexer is likely to be connected to the block of same rank and to the two blocks of immediately greater rank. In the case of FIG. 1A, input $d_0$ is connected to block $M_0$, input $d_1$ is connected to block $M_2$ (instead of block $M_1$), input $d_2$ is connected to block $M_3$ (instead of block $M_2$), and input $d_3$ is connected to block $S_1$ (instead of block $M_3$ or $S_0$). Multiplexer $MUX_0$ performs a zero shifting, multiplexers $MUX_1$ and $MUX_2$ perform a shifting by one step, and multiplexer $MUX_3$ performs a shifting by two steps.

In the embodiment block of FIG. 1B, any defective block is replaced not by one of its non-defective neighbors, but by one of the replacement blocks. A "distant" substitution is performed. Thus, input $d_0$ is connected to block $M_0$, input $d_1$ is connected to block $S_1$, and inputs $d_2$, $d_3$ are connected to blocks $M_2$, $M_3$. Thus, each multiplexer comprises an output towards the corresponding block and two outputs towards blocks $S_0$ and $S_1$. Multiplexers $MUX_0$, $MUX_2$, and $MUX_3$ perform a zero shifting and multiplexer $MUX_1$ performs a shifting by two steps.

The present invention aims at providing an automatic terminals and non-defective memory blocks, that is, the defective memory blocks are replaced with other blocks selected according to the case from among the neighbors of the defective block (case of FIG. 1A), or directly from redundant blocks (case of FIG. 1B).

It should be understood that this problem is relatively complex since, for a given block, to determine to which block the rerouting must be performed, account must be taken of the state of the already-examined blocks, for example, those located to the right (or to the left) of a considered block, and of the state of the possible replacement blocks.

To enable this reconfiguration, the present invention provides for each of the cases (shifting from close to close or distant shifting) a method using sequential operations or a method using a combinational system. Further, in each of the two considered cases, the present invention provides for the operations to be able to be performed in hardware or software fashion.

BRIEF SUMMARY OF THE INVENTION

Generally, the present invention provides using an algorithm in which:

it is started from the block located at a first end of a block sequence, for each block, the number of defective blocks located on the side of the first end (the defective blocks possibly comprising the considered block itself) is counted, an assembly of reserve blocks arranged according to an ordered sequence (the neighboring blocks in the case of FIG. 1A or the redundant blocks in the case of FIG. 1B) is associated with each block, successive blocks are counted from these reserve blocks until a number of non-defective blocks equal to the number of once this result has been obtained, the considered block is replaced with the block shifted in corresponding fashion of the reserve blocks, while non-defective blocks are not replaced in the case where it is directly passed on to the redundant blocks.

BRIEF DESCRIPTION OF THE SEVERAL VIEWS OF THE DRAWINGS

The foregoing objects, features, and advantages of the present invention will be discussed in detail in the following non-limiting description of specific embodiments in connection with the accompanying drawings, in which.

DETAILED DESCRIPTION OF THE INVENTION

Notations

The present application will designate as:

N: the number of base blocks of the memory likely to exhibit defects, and k: the maximum number of defective blocks that can be replaced.

A base block of the initial memory will be called $U_i$, with i ranging between 0 and N−1.

The replacement blocks will indifferently be called $S_0$ to $S_{k-1}$ or $U_N$ to $U_{N+k-1}$.

The multiplexers associated with blocks $U_0$ to $U_{N-1}$ will be called $MUX_0$ to $MUX_{N-1}$.

$d_i$ designates the input of a multiplexer $MUX_i$.

Flip-flops $F_0$ to $F_{N-1}$ and $S_1$ to $S_k$ are respectively associated with the base and replacement blocks and indicate the initial state of the corresponding block. These flip-flops are at 1 if the block is initially defective and at 0 if the block is initially good. The flip-flops are conventionally initialized in a test step during which the operation of each block is checked. According to the present invention, the case where the base blocks as well as the replacement blocks are likely to be defective is treated.

Repair From Close to Close

The case where the repair process is of the type illustrated in FIG. 1A in which, to each multiplexer associated with a block are also associated blocks adjacent to this block will first be considered.

Figure 2:
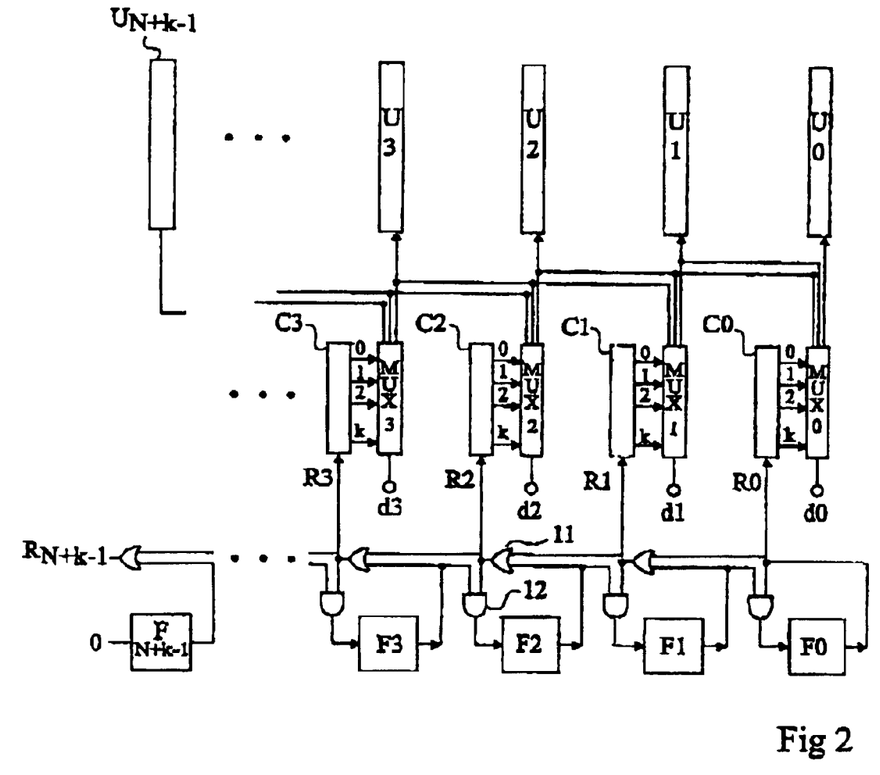
FIG. 2 shows an example of embodiment of a device for reconfiguring memory blocks of sequential type and with a shifting from close to close.

FIG. 2 shows an example of a sequential reconfiguring structure for a repair from close to close of possibly defective cells. In the example shown, each multiplexer $MUX_0$ to $MUX_{N-1}$ is associated with a counter $C_0$ to $C_{N-1}$ which is incremented by a signal $R_i$ ($R_0 \ldots R_{N-1}$) generated by a sequential circuit so that signal $R_i$ takes value 1 for several consecutive clock cycles.

Flip-flops $F_0$ to $F_{N+k-1}$ are initially loaded with a 0 if the corresponding block is good and with a 1 if the corresponding block is defective. Signals $R_i$ to be provided to a circuit for controlling a multiplexer $C_i$ depend on the value of the corresponding flip-flop $F_i$ but also of the flip-flops of lower rank given that, when a position is to be shifted to the left, any position of a greater rank must also be shifted to the left. The value of $R_i$ also depends on the values of the flip-flops of rank greater than i. Indeed, it must be ensured that the block aimed at to be selected as a replacement block is a good block.

To solve this problem, the present invention provides the following algorithm:

a) $F_i=1$ causes $R_i=1$ since, for a defective block $U_i$, there must be at least one shift. Further, each time a signal $R_i$ is activated, it forces all signals of greater rank to the active state. One must thus have $R_i=F_i+R_{i-1}$;

b) When signal $R_i$ is activated ($R_i=1$), the value of flip-flop $F_{i+1}$ is transferred to flip-flop $F_i$ and, if there is no flip-flop $F_{i+1}$, a 0 is transferred to flip-flop $F_i$. This expresses that, at the end of the present clock cycle, input $d_i$ is connected to the block to which input $d_{i+1}$ was previously connected. Thus, flip-flop $F_i$ must indicate the state that was formerly indicated by flip-flop $F_{i+1}$. The following sequential equation must be deduced from the preceding points for flip-flops $F_i$:

$F_i(t+1)=R_i \cdot F_{i+1}(t)$, where t and t+1 indicate two successive times.

$$R_i=R_{i-1}+F_i, \text{ for } N+k-1 \geq i \geq 0 \quad (1)$$

$$F_i(t+1)=R_i \cdot F_{i+1}(t), \text{ for } N+k-1 \geq i \geq 0 \quad (2)$$

The conditions at the limits are that, for flip-flop $R_0$, it is considered that fictitious flip-flop $R_{-1}$ is at state 0 and, for flip-flop $F_{N+k-1}$, it is considered that fictitious flip-flop $F_{N+k}$ is at state 0.

FIG. 2 shows a logic circuit implementing the above logic equations.

The output $F_i$ of each flip-flop is connected to a first input of an OR gate 11 having its output connected by an AND gate 12 to the input of flip-flop $F_i$. The output of OR gate 11 also provides signal $R_i$. The second input of OR gate 11 is connected to the output of the OR gate 11 of the preceding stage. The output of flip-flop $F_{i+1}$ is sent back to the second input of AND gate 12.

Each of the flip-flops is rated by a clock signal which also controls counters $C_i$.

It can be seen that this circuit enables fulfilling the above-mentioned logic equations.

The operation can also be understood by considering the following steps.

At the first clock pulse, it is assumed that first flip-flops $F_0$ and $F_1$ are at state 0. They will thus provide no shift signal to inputs $R_0$ and $R_1$ of counters $C_0$ and $C_1$. The first flip-flop at state 1, for example, flip-flop $F_2$, will provide a signal $R_2$ to counter $C_2$ to increment it. This signal will also be transmitted by the OR gate chain to all the next flip-flops and will increment counters $C_3$ to $C_{N-1}$. The outputs of multiplexers $MUX_2$ to $MUX_{N-1}$ will thus all be shifted by one step. Simultaneously, all the AND gates 12 which follow flip-flop $F_2$ will have a first input enabled and their output will switch to the state of the second input of the corresponding AND gate 12, that is, to the state of the next flip-flop, the last flip-flop $F_{N+k-1}$ taking state 0. Thus, if flip-flop $F_3$ was not at 1, flip-flop $F_2$ takes state 0.

At the next clock pulse, the first flip-flop $F_i$ at 1 will send a signal $R_i$ to counters $C_i$ to $C_{N-1}$ and will shift the outputs of multiplexer $MUX_i$ and of all the following multiplexers. Again, the contents of all flip-flops $F_i$ to $F_{N+k-1}$ will be shifted by one step to the right and the cycle is repeated.

In as many clock cycles as there are is in flip-flops $F_0$ to $F_{N+k-1}$, multiplexers $MUX_0$ to $MUX_{N-1}$ will be set into the appropriate configuration by counters $C_0$ to $C_{N-1}$.

With the diagram of FIG. 2, the above equations (1) and (2) are implemented by a cascade of OR gates in series. Relatively significant delays may result therefrom, which may result in a relatively long duration for the repair phase. It should however be noted that this has no impact, either on the duration of the test phase or on the subsequent duration of normal operation of the memory. Thus, it is possible to use a specific clock of low frequency for the repair phase or the same clock signal as on the other phases, while reducing the clock frequency during the repair phase.

Figure 3:
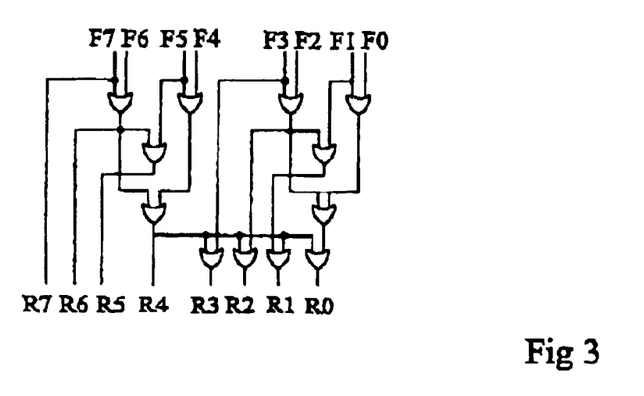
FIG. 3 shows an alternative of a portion of the logic circuit of FIG. 2.

The preceding equations may also be implemented by using a circuit with a shorter delay. FIG. 3 shows an example of a circuit usable to provide eight signals $R_0$ to $R_7$ based on eight flip-flop states $F_0$ to $F_7$.

It should further be noted that signal $R_{N+k-1}$ provided by the last OR gate 11 associated with the last flip-flop $F_{N+k-1}$ is theoretically useless since it is not intended to control a multiplexer (there are only N multiplexers). However, this signal may be used to indicate the success or the failure of the repair process. If $R_{N+k-1}=0$ after k clock cycles of the repair phase, the repair has been successful. However, if $R_{N+k-1}=1$ after k clock cycles, more than k defective blocks. $R_{N+k-1}$ may also be used as a repair phase completion signal. In other words, it is not necessary to wait for k clock cycles to complete the repair phase. It can be stopped as soon as $R_{N+k-1}$ becomes equal to 0. One of signals $R_{N-1}$ to $R_{N+k}$ may be used for this purpose. Signal $R_{N-1}$ is more advantageous since its value 0 will indicate sooner than the others the end of the repair.

Further, the present invention is likely to have various alternatives which will readily occur to those skilled in the art. For example, equations (1) and (2) may be simplified if it is considered that redundant blocks $U_N$ to $U_{N+k-1}$ are defect-free. In this case, flip-flops $F_N$ to $F_{N+k-1}$ associated with these blocks and the associated logic circuits can be eliminated.

The circuit complexity can be reduced by making some assumptions. For example, assuming that when a unit of rank i is reached, i being much smaller than N, there inevitably exists a number of defects $k_i$<k, the number of outputs of the corresponding multiplexers which, instead of being multiplexers with k outputs, may be multiplexers with $k_i$ outputs, can be reduced. The counters associated with these multiplexers may be simultaneously simplified.

Various other simplifications will occur to those skilled in the art according to practical assumptions that they may make about the repair of possible defects.

Combinational Reconfiguration

The previously-described circuit is a circuit with a sequential operation.

It is now desired to directly determine the shift to be various flip-flops $F_0$ to $F_{N+k-1}$, for example, by iteration.

To set the state of a multiplexer, it is considered that each multiplexer $MUX_i$ has k control inputs $M^i_0$ to $M^i_k$ which must all be at zero except for the input that corresponds to the shift which is desired to be adopted by the multiplexer. For example, if block $U_0$ is defect-free, multiplexer $MUX_0$ must cause no shifting, that is, its control input $M^0_0$ must be at 1 and all its other control inputs $M^1_0$ to $M^k_0$ must be at zero.

Calling $F_i$ the state of flip-flop $F_i$ and $\overline{F_i}$ the complementary state, the inputs of multiplexer $MUX_0$ are expressed according to the state of the associated blocks $U_0$ to $U_k$ as follows:

$$M^0_0 = \overline{F_0}$$
$$M^0_1 = \overline{F_1}.F_0$$
$$\ldots$$
$$M^0_k = \overline{F_k}.F_{k-1}\ldots.F_0. \quad (3)$$

In these equations, the points designate $AND_0$ functions. These equations can be well understood noting that, if for example units $U_0$ and $U_1$ are defective, multiplexer $MUX_0$ must perform two shifts, that is, $M^0_0$ and $M^0_1$ will be at zero, $M^0_2$ will be at 1, and all $M^0_3$ to $M^0_k$ will be at zero.

Generally, the state of each of inputs $M^{i+1}_j$ of multiplexer $MUX_{i+1}$ can be expressed according to the inputs of multiplexer $MUX_i$ as follows:

$$M^{i+1}_j = \overline{F_{i+j+1}}(M^i_j + M^i_{j-1} \cdot F_{i+j} + M^i_{j-2} \cdot F_{i+j-1} \cdot F_{i+j} + \ldots + \quad (4)$$
$$M^i_0 \cdot F_{i+1} \cdot F_{i+2} \ldots F_{i+j}), \text{ for } 0 \le j \le k.$$

Based on equations (3) and (4), the equations of $M^i_j$ can generally be obtained for any value of i and j according to variable $F_i$. This may be performed by a simple algorithm. Such an algorithm first establishes in equation (4) value i+1=1 to obtain the equations of signals $M^1_j$ according to variables $F_i$ and to variables variables $M^0_r$ with their expressions according to variables $F_i$ as described by equations (3). Then, functions $M^2_j$ can be similarly calculated by setting i+1=2 in equation (4) then by replacing the expressions of functions $M^0_r$ and $M^1_q$ obtained at the preceding step and so on in functions $M^3_j$, $M^4_j$, ... $M^{N-1}_j$. The calculation of course stops for position N since, as seen previously, there are no multiplexers beyond this position. Signal $R_f = M^N_0.M^N_1 \ldots M^N_k$ may be used to signal the success ($R_f=1$) or the failure ($R_f=0$) of a repair.

Distant Repair

As recalled in the introduction of the present application, repair operations from close to close such as illustrated in FIG. 1A are distinguished from distant repair operations such as illustrated in FIG. 1B in which the good units remain associated with their initial inputs while the defective units are replaced with units selected from the redundant unit group.

For this distant repair mode, a sequential repair mode and a combinational repair mode will as previously be distinguished.

Sequential Reconfiguration

Figure 4:
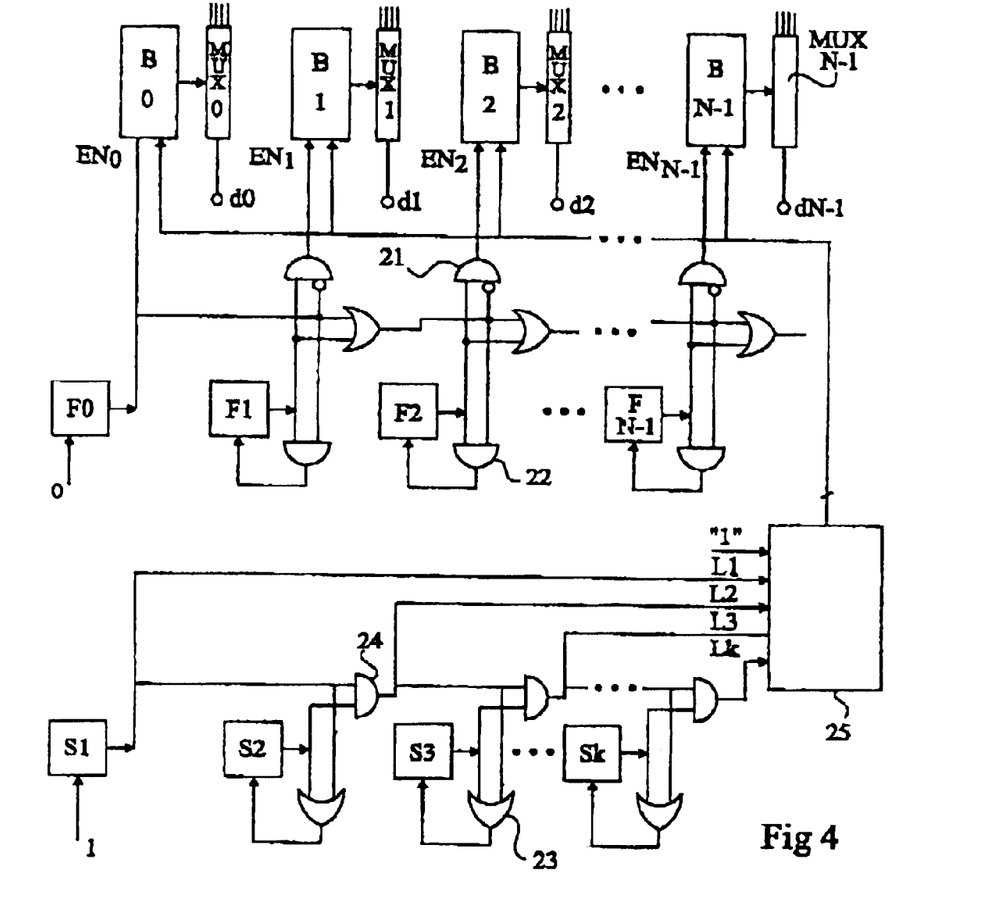
FIG. 4 shows an example of embodiment of devices for reconfiguring memory blocks of sequential type and with a replacement of defective blocks with redundant blocks.

FIG. 4 illustrates a diagram of an embodiment of a sequential repair system.

As in the diagram of FIG. 2, multiplexers $MUX_0$ to $MUX_{N-1}$ associated with inputs $d_0$ to $d_{N-1}$ intended to be connected to non-defective units are shown.

In this example, the multiplexers are arranged from right to left instead of being arranged from left to right as previously. It could also have been chosen to modify the numbering and to start from N−1 down to 0.

To each unit is associated a control circuit which, instead of being as previously a counter is, this time, formed of an assembly of k+1 flip-flops to memorize the exact values of the control signals in a 1-among-k+1 code. These control circuits are designated in FIG. 4 with references $B_0$ to $B_{N-1}$.

The flip-flops indicating the good or defective state of the blocks initially associated with the various multiplexers are designated as previously with references $F_0$ to $F_{N-1}$ for the flip-flops associated with the base blocks and with references $S_1$ to $S_k$ in the shown example for redundant blocks.

As concerns the multiplexer control flip-flops, a smaller number of flip-flops may also be used in each assembly to code the values of these signals in a more compact code, for example, a binary code, combined with a decoder which provides the 1-among-k+1 code. This flip-flop assembly may be formed to only carry out the load function. In this case, another circuit will have to be used to calculate the number of positions by which the input output terminal $d_i$ must be shifted towards the redundant blocks and these results will have to be loaded in the repair flip-flops.

Another possibility is to provide the repair flip-flops according to a counter configuration as previously done.

It should be noted that in the case of FIG. 4, the repair is performed according to a shifting to the right, which means that the leftmost functional unit is first repaired. Two sequential functions acting at the rate of a clock which, at each cycle, especially activates flip-flops $F_0$ to $F_{N-1}$ and $S_1$ to $S_k$ will be used.

The first sequence using flip-flops $F_0$ to $F_{N-1}$ generates signals $EN_0$ to $EN_{N-1}$ which enable or not the corresponding control circuits. Each flip-flop $F_i$ is connected to control circuit $B_i$ by an AND gate 21 which previous flip-flops. Thus, if a flip-flop $F_i$ contains a 0 (good corresponding block), control circuit $B_i$ is inhibited and multiplexer $MUX_i$ is not shifted. The output of flip-flop $F_i$ is connected by an AND gate 22 to the input of flip-flop $F_i$. Thus, if flip-flop $F_i$ initially contains a 0, its state always remains at 0. The second input of AND gate 22 receives the OR function of all the previous flip-flops. Thus, in a clock cycle, only the control circuit associated with the defective block not yet repaired, located leftmost, is enabled.

The second functional sequence is implemented by using flip-flops $S_1$ and $S_k$ and generates at any time the number of positions having a defective block, at the considered cycle, signaled by an active signal $EN_i$, which must be shifted towards one of the redundant blocks (not shown in FIG. 4).

The output of each flip-flop $S_i$ is connected at its input to an OR gate 23 having its input connected to the output of an AND gate 24 which receives the outputs of flip-flop $S_{i-1}$ and of the previous AND gate. Call $L_i$ the output of the AND gate which follows flip-flop $S_i$. Outputs $L_i$ are provided to a combinational 1 counter 25 which receives a 1 on its first input. Thus, counter 25 provides the number of positions by which the defective base block indicated by an active signal $EN_i$ must be shifted in the redundant blocks to perform a repair.

Figure 5:
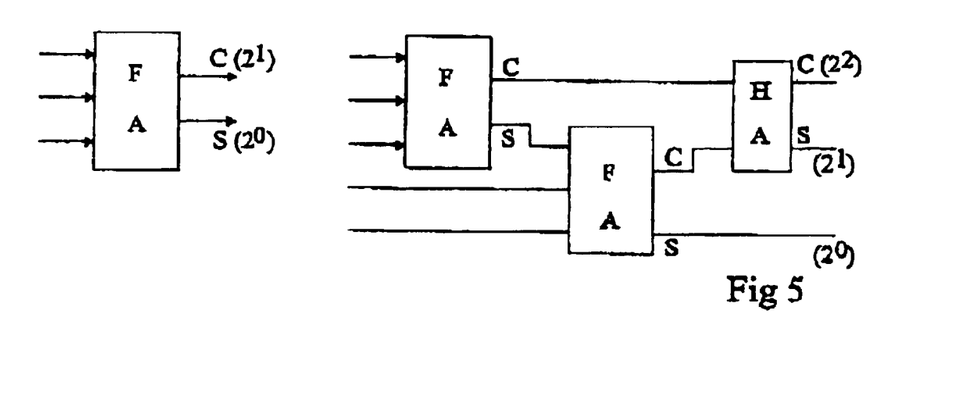
FIG. 5 shows two example of 1 counters used in the logic circuit of FIG. 4.

A combinational 1 counter may be formed in various ways. Two examples of such embodiments for k=3 and k=5 using full adders (with three inputs) FA and half-adders (with two inputs) HA are shown in FIG. 5. These counters provide a binary coded result. Other embodiments many provide a result coded in another way, for example, according to a 1-among-k+1 code.

A sequential 1 counter may also be implemented. For example, this can be done by using a shift circuit with k+1 cells. Cell 0 is loaded with 1. Signals $L_1, L_2 \ldots L_k$ shifted to the right until the first 0 is provided to the output.

For the shift calculation, intermediary functions $FI_i$ will be used. Function $FI_i$ is at 1 if any one of signals $F_i$, $F_{i+1}, \ldots F_{N-1}$ is at 1. This provides the following recursive equations:

$$FI_i = FI_{i-1} + F_i, \text{ with } 0 \leq i \leq N-1 \text{ and } FI_{-1} = 0 \quad (5)$$

Flip-flop $F_i$ maintains its state while one of flip-flops $F_{i-1}$, $F_{i-2}, \ldots F_{N-1}$ is at 1. This condition implies that $FI_{i-1} = 1$. One thus obtains:

$$F_i(t+1) = FI_{i-1} \cdot F_i(t) \text{ with } 0 \leq i \leq N-1 \quad (6)$$

Signal $EN_i$ switches to 1 if $F_i$ is at 1 and all flip-flops $F_{i-1}$ to $F_0$ are at 0. This implies that $FI_{i-1} = 0$. One thus obtains:

$$EN_i = \overline{FI_{i-1}} \cdot F_i \quad (7)$$

The circuit formed from flip-flops $S_i$ updates the content of these flip-flops at each clock cycle. This updating is such that at any cycle, the flip-flops $S_i$ indicating an available unit contain a 0 and the other flip-flops $S_i$ contain a 1. Thus, an available redundant block is a defect-free block which is not yet taken up by the repair of a defective functional block. A defective redundant block remains always unavailable, that is, $S_i$ remains always equal to 1. A defect-free redundant block becomes unavailable at a cycle t+1 if at cycle t all the preceding flip-flops $S_i$ are at 1. Thus:

$$L_0 = 1, L_i = L_{i-1} \cdot S_i, 1 \leq i \leq k \quad (8)$$

$$S_i(t+1) = S_i(t) + L_{i-1}, 1 \leq i \leq k \quad (9)$$

Based on these equations, signals $L_1, L_2 \ldots L_k$ take values $L_1 = L_2 = \ldots = L_{j-1} = 1, L_j = L_{j+1} = \ldots = L_k = 0$, where j is the smallest integer for which $S_j = 0$. In this case, redundant block j+1 is the first redundant block available to perform a repair.

Signals $L_k$ and $FI_{N-1}$ may be used to complete the repair phase. $FI_{N-1} = 0$ indicates that all positions are correct and that the repair can be ended. $L_k = 1$ indicates that there is no remaining available unit.

The repair can also be performed by using repair counters rather than repair flip-flops $B_i$. The repair counter may be a binary counter followed by a decoder to generate a 1-among-k+1 code, or a shift register. In this case, counter 25 may be replaced with a sequential 1 counter such as a shift circuit. Value 1 of the leftmost cell of this shift circuit will be used to keep the states of flip-flops F and S. Value 0 of this cell will be used to maintain the state of the sequential counter until its next loading.

The leftmost cell of the shift circuit will be at 1 for $k_i$ clock cycles, where $k_i$ is equal to the number of signals $L_j$ having value 1, plus 1. Then, $k_i$ is equal to the number of positions by which the defective block $U_i$ indicated by state $EN_i = 1$ must be shifted towards the redundant units. Signal $EN_i$ will be maintained at value 1 for $k_i$ clock cycles. Thus, by using signal $EN_i$ as the signal which enables the counting operation of the repair counter of position i, the values required on the control signals of the repair multiplexer of position i can be generated.

With this last implementation, signals $S_1, S_2 \ldots S_k$ may also be loaded into the register implementing the 1 counter instead of signals $L_1, L_2 \ldots L_k$. The reason for this is that these signals are equal until and including the leftmost position of state 0. These positions are those which determine the circuit operation.

As previously, the distant repair system may also be implemented by a combinational function which will be defined in incremental fashion. Taking the notations of section 2.2, one has the following equations:

$$M^0_0 = \overline{F_0}$$

$$M^0_1 = \overline{S_1} \cdot F_0$$

$$\ldots$$

$$M^0_k = \overline{S_k} \cdot S_{k-1} \ldots S_1 \cdot F_0. \quad (10)$$

The equations corresponding to an arbitrary terminal $d_j$ imply variables F and S. To calculate variables $M^{i+1}_j$, it is not possible to use variables $M^i_r$ as indicators of the number of redundant blocks taken up after the repair of some base blocks. This is due to the fact that if base block $U_i$ is defect-free, all functions $M^i_1$ to $M^i_k$ are at 0 although some of blocks $U_0$ to $U_{i-1}$ may be defective. Thus, intermediary variables $MI^i_j$ which count the number of redundant blocks taken up by the defective base blocks are thus introduced. These variables are determined by the following equations:

For position 0, variables MI are equal to variables M:

$$MI^0_j = M^0_j \text{ for } 0 \leq j \leq k \quad (11)$$

For position i+1, variables $MI^{i+1}_j$ are equal to variables $MI^i_j$ if block $U_{i+1}$ is defect-free. Otherwise they are equal to $M^{i+1}_j$. Thus, one has:

$$MI^{i+1}_j = MI^i_j \cdot \overline{F_{i+1}} + M^{i+1}_j \cdot F_{i+1} \ 0 \leq i \leq N-2 \text{ and } 0 \leq j \leq k \quad (12)$$

Variable $M^{i+1}_0$ is equal to 1 if block $U_{i+1}$ is defect-free. Variable $M^{i+1}_{j+1}$ is equal to 0 if block $U_{i+1}$ is defect-free. If $U_{i+1}$ is defective, $M^{i+1}_{j+1}$ becomes equal to 1 if $S_{j+1}$ is defect-free and if there exists an integer $r \leq j$ such that r defective and defect-free redundant blocks are already taken up to repair units $U_q$ with $q \leq i$, and redundant blocks $S_{r+1}$, $S_{r+2} \ldots S_j$ are defective. This analysis results in the following equations:

$$M^{i+1}_0 = \overline{F_{i+1}},$$

$$M^{i+1}_{j+1} = \overline{S_{j+1}} \cdot F_{i+1}(MI^i_j + MI^i_{j-1}S_j + MI^i_{j-2}S_{j-1}S_j + \ldots MI^i_0 S_1 S_2 \ldots S_j),$$
$$\text{for } 0 \leq j \leq k-1, 0 \leq i \leq k-2, \quad (13)$$

Thus, equations (10) to (13) describe function M recursively and may be implemented by any appropriate software or hardware.

Of course, the present invention is likely to have various alterations, modifications, and improvements which will readily occur to those skilled in the art. In particular, each state indication flip-flop is associated with enable signals for, in a test mode, loading according to the good or bad state of the corresponding block and, in repair mode, operating in the previously-described fashion.

Alternative Multiplexings

In FIG. 2, the data may propagate:

from units $U_1$ to $U_{N+k-1}$ to terminals $d_0$ to $d_{N+k-1}$ (for example, in the case where $d_0$ to $d_{N+k-1}$ are the read data bus of a memory).

This case will be called a read-type configuration. from terminals $d_0$ to $d_{N+k-1}$ to units $U_1$ to $U_{N+k-1}$ (for example, in the case where $d_0$ to $d_{N+k-1}$ are the unit selection signals).

This case will be called a write type configuration.

in both directions (for example, in the case where $d_0$ to $d_{N+k-1}$ are the bi-directional read/write bus of a memory). This case will be called a bi-directional configuration.

Figure 6:
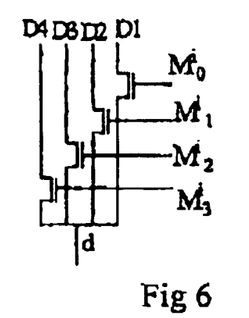
FIGS. 6 to 10 illustrate alternative rerouting devices.

In the case of the bi-directional configuration, the used multiplexers must enable bi-directional propagation of the signals. A multiplexer of 1-among-4 type is shown in FIG. 6. A bi-directional multiplexer may also be used in the case of configurations of read type and of write type.

Figure 7:
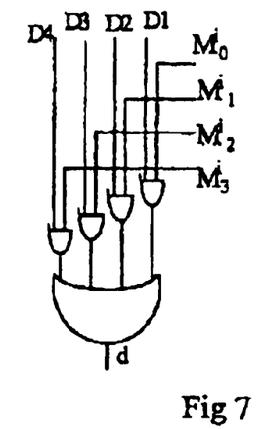

In the case of the read-type configuration, a multiplexer only enabling propagation of the k output signals $D_0$ to $D_{k-1}$ from units $U_1$ to $U_{N+k-1}$ to signal d may also be used. Such a multiplexer for the case k=4 is shown in FIG. 7.

Figure 8:
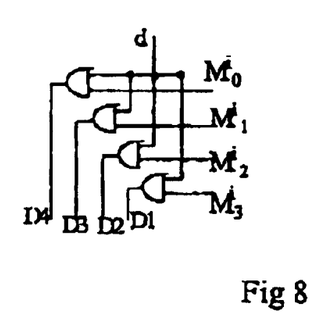

In the case of the write-type configuration, a "multiplexer" only enabling propagation of signal d towards the k signals $D_0$ to $D_{k-1}$ may also be used. This circuit, which is not a multiplexer in the usual meaning of this term, will be called k-among-1 MUX. A circuit of this type for case k=4 is shown in FIG. 8. It should be noted that in this drawing, $M_j^i=1$ implies $D_j=0$. Accordingly, if a signal G is to be generated by combining several signals $D_j$ coming from the outputs of several circuits of k-among-1 type, an OR gate receiving signals $D_j$ and providing signal G must be used. However, if a bi- then the OR gate will not be used since signal G will be generated by using a wired connection of signals $D_j$. Thus, a write-type configuration, using circuits of k-among-1 MUX type, will require replacing the wired connection of signals $D_j$ with OR gates, while the use of bi-directional multiplexers does not require use of OR gates. However, in certain cases, the signal provided to a unit must take value 1 in the active state and value 0 in the inactive state. This constraint is not fulfilled when the bi-directional multiplexer of FIG. 6 is used; it is however fulfilled when the circuit of k-among-1 MUX type shown in FIG. 8 is used, combined with the OR gate. The signal provided to a unit may also have to take value 0 in the active state, and value 1 in the inactive state. In this case, circuits of k-among-1 MUX type performing the function $M_j^i=1$ implies $D_i=d$ and $M_j^i=0$ implies $D_i=1$, combined with AND gates, will be used.

In other implementations, the outputs d of the several 1-among-k multiplexers may be combined to generate a signal G. If bi-directional multiplexers are used, signal G can be generated by using a wired connection of signals d. However, if 1-among-k multiplexers formed as in FIG. 7 are used, the wired connection must be replaced with an OR gate. The reason for this is that the multiplexer of FIG. 7 implements the following function: $M_0^i, M_1^i, \ldots M_j^i, \ldots M_k^i=00 \ldots 1 \ldots 0$ implies $d=D_j$ and $M_0^i=M_1^i, \ldots = M_j^i, \ldots = M_k^i=0$ implies $d=0$. Thus, it will be less expensive to use a bi-directional multiplexer. However, signal G may take value 0 in the inactive state. In this case, it will be necessary to use a multiplexer formed as in FIG. 7. On the other hand, if signal G must take value 1 in the inactive state, multiplexers of 1-among-k type must be used, implementing the following function: $M_0^i, M_1^i, \ldots M_j^i, \ldots M_k^i=00 \ldots 1 \ldots 0$ implies $d=D_j$ and $M_0^i=M_1^i, \ldots = M_j^i, \ldots =M_k^i=0$ implies $d=1$.

A last case of the multiplexing circuits corresponds to circuits implementing the same functions as those described previously, except that complementary values are applied to their inputs. For example, implication $M_0^i, M_1^i, \ldots M_j^i, \ldots M_k^i=00 \ldots 1 \ldots 0$ implies $d=D_j$, becomes $M_0^i, M_1^i, \ldots M_j^i, \ldots M_k^i=11 \ldots 0 \ldots 1$ implies $d=D_j$.

Figure 9:
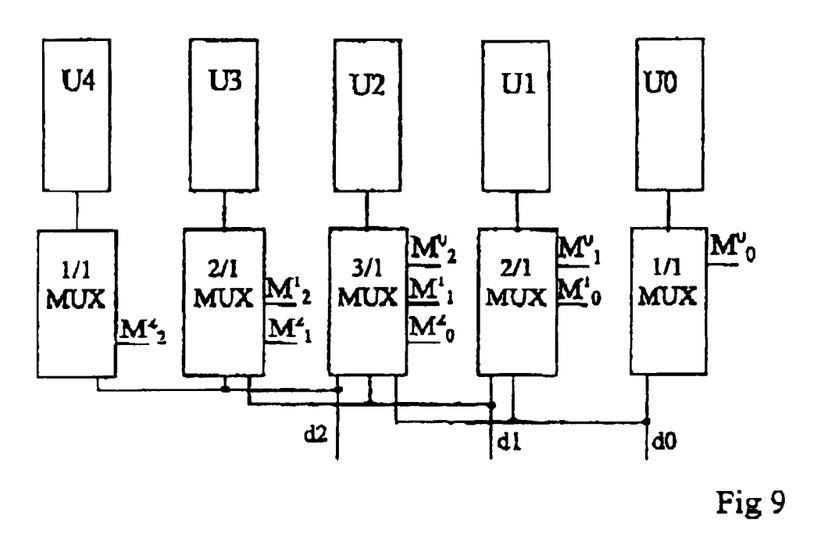

Another way of performing the branching from close to close is shown in FIG. 9, in which N=3 and k=2. To perform the multiplexing, branching circuits such as shown in FIGS. 6, 7, and 8 are used. If the circuits of FIG. 1A are bi-directional multiplexers, FIG. 9 will use bi-directional multiplexers. If the circuits of FIG. 1A are 1-among-k multiplexers like the circuit of FIG. 7, FIG. 9 will use branching circuits of k-among-1 MUX type, like the circuit of FIG. 8. If the circuits of FIG. 1A are circuits of k-among-1 MUX type like the circuit of FIG. 8, FIG. 9 will use 1-among-r multiplexers, like the circuit of FIG. 7.

It is considered that FIG. 9 uses circuits of r-among-1 MUX type. Terminal d of each of these circuits is connected on the input/output signal of one of units $U_1, U_2, \ldots, U_{N+k-1}$. The branching circuit connected to the input/output of unit $U_i$ will be called $CM_i$.

Terminals $D_j$ of the branching circuits are combined to generate signal $d_0, d_1, \ldots d_{N+k-1}$. For the branching circuits $CM_i$ of r-among-1 type, the values of r will be:

$r=i+1$ for $0 \leq i \leq k-1$, $r=k+1$ for $k \leq i \leq N-1$, $r=N+k-i$ for $N \leq i \leq N+k-1$.

For $0 \leq i+j \leq N-1$, signal $M_j^i$ selects the connection of terminal $D_i$ of circuit $CM_{i+j}$ to the input/output terminal of unit $UM_{i+j}$. For $N \leq i+j \leq N+k-1$, signal $M_j^i$ selects the connection of terminal $D_{N-j-1}$ of circuit $CM_{i+j}$ to the input/output terminal of unit $UM_{i+j}$. The terminals $D_i$ selected by signals $M_0^i, M_1^i, \ldots, M_k^i$ are combined to same if the branching circuits of FIG. 9 are 1-among-r multiplexers.

A similar transformation may be used in the case of the distant configuration system illustrated in FIG. 1B. In this case, parameter r of the branching circuits takes the following values:

$r=1$ for $0 \leq i \leq N-1$, and $r=k+1$ for $N \leq i \leq N+k-1$.

For $0 \leq i \leq N-1$, signal $M_0^i$ selects the connection of the input/output terminal of unit $U_i$ to terminal $D_0$ of branching circuit $CM_i$, which indeed has a single terminal of type $D_i$. For $0 \leq i \leq N-1$ and $1 \leq j \leq k$, signal $M_j^i$ selects the connection of the input/output terminal of unit $U_{N+j-i}$ to terminal $D_i$ of branching circuit $CM_{N+j-i}$. The terminals $D_i$ selected by signals $M_0^i, M_1^i, \ldots, M_k^i$ are combined to generate signal $d_i$.

In systems obtained by the preceding transformations, signals $M_j^i$ take the same values as in the original system. The solutions for generating signals $M_{1j}$ discussed herein are thus valuable for systems obtained by these transformations.

Repairs Using an Insufficient Redundancy

A system comprising N functional units, k redundant units and capable of repairing up to r defective units, with $r > k \geq 0$ is now considered. In the case where the number of defective units does not exceed k, the system, after repair, will operate with N units. If the number of defective units is q with k<q≦r, the system will operate with N+k−q units. It is assumed that N selection signals $d_0, d_1, \ldots, d_{N-1}$ are available, each selecting a unit. The repair will consist of rerouting signals $d_0, d_1, \ldots, d_{N+k-q-1}$ to replace each defective functional unit with a defect-free unit. Further, the repair system may possibly units so that the rest of the system only uses the resources of the non-defective units which will be seen by the system as being the first N+k−q units of the configuration.

To illustrate the advantage of this solution, consider that units $U_0, U_1, \ldots, U_{N+k-1}$ are blocks of a memory, each comprising R addresses. The system can exploit a memory comprising a total number of R.N addresses. In this configuration, it provides the best performances, but it may also operate with a memory of smaller capacity.

Signals $d_0, d_1, \ldots d_{N-1}$ are generated, for example, by the decoding of a number of addressing bits equal to $[\log_2(N)]$. Value 00 . . . 0 of these bits enables signal $d_0$, value 00 . . . 1 enables signal $d_1$, etc., until value N−1 expressed in binary notation, which will enable $d_{N-1}$. In the case of q defective units where the system will use a memory space comprising only R(N+k−q) addresses, it is important for this addressing space not to be fragmented, that is, the system has a memory covering addressing space 0, 1, . . . R(N+k−q). The provided repair system enables this unification by the rerouting of signals $d_0, d_1, \ldots d_{N+k-q}-1$ and may provide signals indicating the invalid addressing space.

The technique provided herein to do this repair implements the same repair circuit in the case where number k of the redundant units is equal to number r of defective units that are intended to be repaired, except for given multiplexers, as will be described hereafter.

A local repair is here considered. The missing units to have a number of redundant units equal to r are units $U_{N+r-i}$ such that $1 \leq i \leq r-k$.

The groups of control signals that select any unit $U_{N+r-i}$ such that $1 \leq i \leq r-k$ are signals $M^{N-j}_{r+j-i}$ such that $1 \leq i \leq r-k$ and $1 \leq j \leq i$. This control signal group will not enter the multiplexer of rank N−j, which will thus have will further have r+j−i terminals of type $D_q$ instead of r+1. The missing terminals will be the terminals $D_{r-j+1}$ such that $1 \leq j \leq i$.

Further, the control signals unused by the multiplexers may be used to indicate the invalid addressing space. For this purpose, binary signals @i will be formed for any i, such that $1 \leq i \leq r-k$. These signals are determined by:

$$@i = \prod_{j=1}^{i} M^{N-j}_{r+j-i}$$

In this formula, $$\prod_{j=1}^{i} G_j$$

represents the logic AND of all terms $G_j$ such that $1 \leq j \leq i$. The signal @i with the smallest index i such that @i=1 indicates that the addressing is limited to the sole (N+k+i−r−1)R first addresses.

Figure 10:
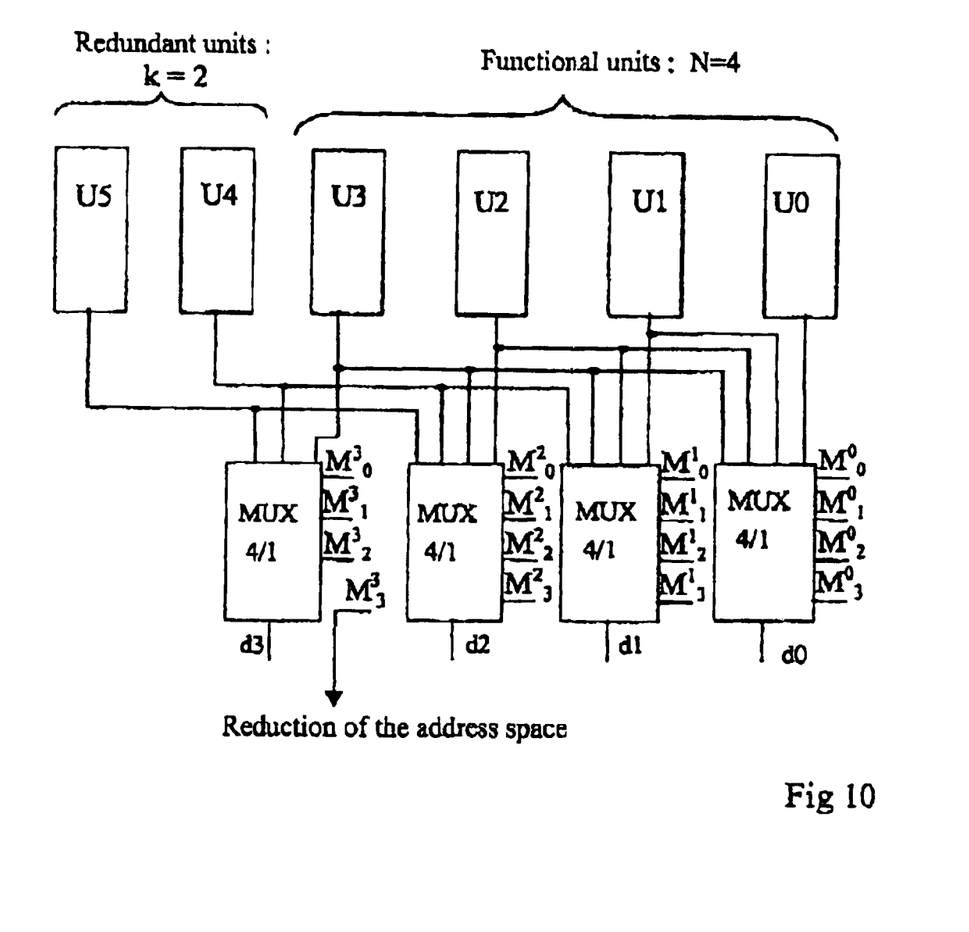

FIG. 10 gives the example of the technique for N=4 functional units, k=2 redundant units, and r=3 repairable defective units. It should be observed that the implementation is the same as in the case where N=4, k=r=3 (4 functional units, 3 redundant units, and 3 repairable defective units), except for the last multiplexer which is a 1-among-3 multiplexer instead of a 1-among-4 multiplexer. Signal $@1=M^3_3$ indicates that the last R addresses are invalid.

Repair for a CACHE Memory

A last repair solution resulting in very low costs relates to the case of CACHE memories. These memories may have a memorization point or flag, called hereafter a validity flag, or Fg. Fg indicates whether a memory word is valid or invalid. For example, Fg=1 indicates that the word is valid and Fg=0 indicates that the word is invalid. In this last case, the system performs the operation in another one of its memories. The value of the memorization point is handled during the system accesses to the CACHE memories and to the other memories. It is here provided to introduce for each word in the CACHE memory (or for a set of words) another flag-type memorization point, here called a defect flag or Fd. The content of Fd is handled only during the circuit testing, and it is set to the value indicating a defective word (for example, for Fd=1) or to the value indicating a non-defective word (for example, for Fd=0). Upon operation of the system, the content of Fd is blocked at its value set in the test phase. Then, if Fd indicates a defective word, the operation will be performed in another memory. Given that the value of Fd has been set before the system operation starts, no operation will be performed in the defective word, and any data which could have been stored in the word had it been non-defective, will be stored in another memory, enabling coherent operation of the system. Given that the number of defects in an integrated circuit is generally small, this approach non-significantly reduces the CACHE capacity and it has but a minute influence upon the system performances.

The CACHE memories are used to reduce the frequency of the accesses to the system memory. The cells of a word of a CACHE memory are shared in a portion called the key and in a data portion. The addressing bits of the system memory are divided in two parts, called hereafter the first part and the second part. The first part of the addressing bits is used to select a word from the CACHE memory. In a write operation, the second part of the addressing bits is stored in the key portion of the selected word, while the data of the write operation are stored in the data portion. In a read operation, the key portion and the data portion of the selected word are read. The content of the key portion is compared with the second part of the addressing bits of the write operation. If the comparison succeeds, it can be said the values read from the data portion are used as the result of the read operation. If the comparison fails, the system memory is accessed to to perform a reading. In most cases, each value of the first part of the addressing bits selects a single word from the CACHE memory. But in certain CACHE memories, the same value of the first part of the addressing bits may select several words. Thus, in the first case, if a word is invalid since its defect flag indicates a defective word, then each operation, such that the value of the first part of the addressing bits selects this word, will be performed in the system memory. In the second case, an operation selecting a word of which the defect flag indicates that it is defective will not necessarily have access to the system memory, since the operation may succeed in one of the other words of the CACHE memory selected by the same value of the first part of the addressing bits.

A similar technique may be used for CAM-type memories (Content Addressable Memory). A CAM may be considered as a CACHE memory for which the first part of the addressing bits is empty. Thus, all addressing bits are stored in the key portion. However, the key portion of each word has a comparator. Thus, in a read operation, the read address is compared in parallel with the content of the key portion of each word. If the comparison succeeds for a word, the output of the comparator of this word selects the data portion of the word. Thus, the content of the data portion of the word can be read at the memory output.

In write mode, there are two possible cases.

Like for a reading, the address is compared with the key portion of the words. If the comparison succeeds for a word in the CAM, the output of the comparator of this word selects the data portion of the word and the writing is performed into this portion.

There is no comparison of the address, but a criterion is used to select a word from the CAM, and the write address is written into the key portion of the word, and the data of the write operation are written into the data portion of the word. In this case, to select the word to be written, various criteria are used from one system to the other. Often, this type of writing selects the word to which access has been had the least recently, but other criteria are also used according to the system. The use of flags which allow or forbid access to a word also is a current doing.

To repair a CAM, a defect flag cell Fd is added to each word. In test phase, if a defect is detected in a word, a 1 is written into the cell of flag Fd of the word. In normal operation, value 1 of flag Fd forbids any access to the defective word. The operations implying the defective word may then be performed in another memory of the system. However, conversely to a CACHE memory, in a CAM, any word can be replaced with any other word. In fact, given that each word is selected only by the content of its key portion, there is no word differentiation according to the value of the addressing bits. Thus, in the present case, there is no need to access to another system memory, since all operations can be performed in the non-defective words of the repaired CAM. Further, the CAM may comprise a sufficient number of words to have after repair a satisfactory capacity for the system.

The CAM provided herein may further be used to repair another memory by replacing each defective word with a non-defective word of the CAM. For this purpose, the following steps are carried out.

The CAM is first tested and, each time a defect is detected in a word, a 1 is written into flag Fd of this word. The content of flags Fd is no longer modified after The memory to be repaired is tested and, each time a defect is detected in a word, the value of the address which has selected the defective word is written into the key portion of a word in the CAM. To select the CAM word in which this writing will be performed, various procedures may be used. Such a procedure consists of using, in the test phase of the memory, a binary counter with a decoder. Each output of the decoder selects in a test phase of the memory a CAM word. On each writing into the CAM, the counter is incremented. Thus, the next writing of an address will be performed into another word. During this phase, the value of flag Fd is also verified. If, for a CAM word, one has Fd=1, then another CAM word is selected to write an address. In the implementation using the counter and the decoder, each time a word is selected with Fd=1, the counter is incremented again, before writing an address. Of course, the counter and the decoder may be replaced with a shift register having one bit set to 1, and all its other bits at 0.

In normal operation, each address of a write or read operation in the memory is compared in parallel with the key portions of all the CAM words. If the comparison succeeds for a word, which further has Fd=0, the current operation is performed in this CAM word, instead of being performed in the memory. Thus, in the case of an operation intended to write into the memory, the data to be written are written into the data portion of this CAM word, and in case of a reading, the data portion of this CAM word is read from and the result is provided to the system instead of the data that should be read from the memory.

It is thus succeeded in repairing the defective words in the memory, as well as in protecting the system against defects in the CAM words. It should be noted Fd, and in another portion of the word, the defective flag may indicate that the word is not defective. To reduce the probability of this event, the cell of this flag may be repeated once or several times, and the word may be invalidated if at least one of the flag cells is at 1. However, the probability of occurrence of such defects remains very low for current technologies and a single cell will be used for flag Fd. The increase in the density of the defects provided for nanotechnologies may make the replication of the cells of flag Fd advantageous.

The repair system may be provided so that the memory can be reconfigured not only during the manufacturing test, but also during the different test phases executed along the circuit lifetime. In this case, Fd will be stored in a reprogrammable memorization point (volatile or non-volatile). On the other hand, if the repair is only performed during the manufacturing test, Fd may be stored in a non-reprogrammable memorization point, for example, in a device setting a logic value by means of a fuse.

In the foregoing description of combinational reconfiguration systems, codings of 1-among-k+1 type of states $M^i_0$ to $M^i_k$ of demultiplexer inputs have been described. Binary coding systems could also have been provided. It will be within the abilities of those skilled in the art to perform a bi-unique correspondence between the two coding types. In this case, the binary signals will take value q when signal $M^i_q$ is equal to 1 and all the other signals $M^i_0$ to $M^i_k$ are at 0. Those skilled in the art may further apply this principle to code the number of shifts by one position according to any other code.

Such alterations, modifications, and improvements are intended to be part of this disclosure, and are intended to be within the spirit and the scope of the present way of example only and is not intended to be limiting. The present invention is limited only as defined in the following claims and the equivalents thereto.

What is claimed is:

1. A device for reconfiguring an assembly of N base electronic units associated with k redundant units, k of the N+k units being likely to exhibit a defect, comprising:

N 1-among-k+1 multiplexers ($MUX_i$), each multiplexer having a first terminal ($d_i$) capable of being connected to one of k+1 second terminals respectively connected to the k+1 input/output terminals of an ordered group of units formed of a base unit ($U_i$) and of k other units;

N+k flip-flops ($F_i$), each flip-flop being indicative of a good or bad state of one of the n base units and of the k units of said ordered group; and logic means associated with each multiplexer of rank j, j being an integer between 0 and N, for determining a first number corresponding to the number of flip-flops of rank 0 to j indicating a bad state, determining a second number corresponding to the number of units of the ordered group associated with the unit of rank j, to be counted from the first unit of said ordered group, to find a number of good units equal to the first number, connecting the first terminal of the multiplexer to its second terminal of rank equal to the second number, and possibly inhibiting the shifting of the multiplexers corresponding to good blocks.

2. The reconfiguring device of claim 1, in which the repair is performed from close to close and sequentially, wherein the logic means ($F_i$, 11, 12, $C_i$) provides at each cycle of a clock a possible multiplexer shift control signal and a signal for controlling the flip-flop contents ($F_i$) according to the following equations:

$$R_i = R_{i-1} + F_i \text{ for } N+k-1 \geq i \geq 0 \quad (1)$$

$$F_i(t+1) = R_i . F_{i+1}(t) \text{ for } N+k-1 \geq i \geq 0 \quad (2)$$

where t and t+1 indicate two successive times.

3. The reconfiguration device of claim 1, wherein the logic means comprises:

an OR gate (11) receiving the output of each flip-flop of rank i ($F_i$) and of the preceding flip-flop ($F_{i-1}$);

an AND gate (12) receiving the outputs of the OR gate (11) and of the flip-flop of rank i+1 ($F_{i+1}$); and a counter ($C_i$) for controlling the multiplexer ($MUX_i$), receiving the output of the OR gate (11).

4. The reconfiguration device of claim 1, wherein the repair is performed from close to close and is performed according to the following combinational equation:

$$M_j^{i+1} = \overline{F_{i+j+1}}(M_j^i + M_{j-1}^i \cdot F_{i+j} + M_{j-2}^i \cdot F_{i+j-1} \cdot F_{i+j} + \ldots + M_0^i \cdot F_{i+1} \cdot F_{i+2} \ldots F_{i+j}), \text{ for } 0 \leq j \leq k. \quad (4)$$

5. The reconfiguration device of claim 1, in which the repair is performed in distant sequential fashion, wherein the logic means ($F_i$, $S_j$, 21–25, $B_i$) provides at each cycle of a clock a control signal of the possible shifting of a defective multiplexer and a signal for controlling the contents ($F_i$, $S_j$) of the flip-flops according to the following equations:

$$FI_i = FI_{i-1} + F_i, \text{ with } 0 \leq i \leq N-1 \text{ and } FI_{-1} = 0 \quad (5)$$

$$F_i(t+1) = FI_{i-1} . F_i(t) \text{ with } 0 \leq i \leq N-1 \quad (6)$$

$$EN_i = FI_{i-1} . F_i \quad (7)$$

$$L_0 = 1, L_i = L_{i-1} . S_i, 1 \leq i \leq k \quad (8)$$

$$S_i(t+1) = S_i(t) + L_{i-1}, 1 \leq i \leq k \quad (9)$$

where: $FI_i$ is a variable, $F_i(t)$ designates the state of a flip-flop associated with a base unit at time t, $EN_i$ designates an enable signal applied to a multiplexer control circuit, $L_i$ designates a signal such that the sum of the $L_i$, plus 1, is applied to a multiplexer control circuit at time t, $S_i(t)$ designates the state of a flip-flop associated with a replacement unit at time t.

6. The reconfiguring device of claim 1, wherein the repair is performed in distant fashion and is carried out $$M^{i+1}{}_0 = \bar{F}_{i+1},$$

$$M^{i+1}{}_{j+1} = \bar{S}_{j+1} F_{i+1}(MI^i_j + MI^i_{j-1} S_j + MI^i_{j-2} S_{j-1} S_{j+} \ldots MI^i_0 S_1 S_2 \ldots S_j),$$
$$\text{for } 0 \leq j \leq k-1, 0 \leq i \leq k-2, \quad (13)$$

where: $F_i$ designates the state of a flip-flop associated with a base unit, $S_i$ designates the state of a flip-flop associated with a replacement unit $MI^i_j$ is a variable such that:

$$MI^{i+1}{}_j = MI^i_j . \bar{F}_{i+1} + M^{i+1}{}_j . F_{i+1} \; 0 \leq i \leq N-2 \text{ and } 0 \leq j \leq k \quad (12).$$

* * * * *